United States Patent [19]

Hinger

[11] 4,361,100
[45] Nov. 30, 1982

[54] PROCEDURE AND INSTALLATION FOR THE INCINERATING OF SLUDGE

[75] Inventor: Klaus-Jürgen Hinger, Stuttgart, Fed. Rep. of Germany

[73] Assignee: Werner & Pfleiderer, Stuttgart, Fed. Rep. of Germany

[21] Appl. No.: 254,876

[22] Filed: Apr. 16, 1981

[30] Foreign Application Priority Data

Apr. 21, 1980 [DE] Fed. Rep. of Germany ....... 3015290

[51] Int. Cl.$^3$ ............................................... F23G 7/04
[52] U.S. Cl. ..................................... 110/238; 110/226; 110/229; 110/246; 110/257; 110/346; 110/110
[58] Field of Search ............... 110/238, 246, 255, 257, 110/226, 229, 346, 110; 48/76, 113

[56] References Cited

U.S. PATENT DOCUMENTS

| | | | |
|---|---|---|---|
| 3,954,069 | 5/1976 | Loken | 110/226 X |
| 4,108,088 | 8/1978 | Burden, Jr. | 110/246 |
| 4,205,613 | 6/1980 | Rito et al. | 110/246 |
| 4,213,407 | 7/1980 | Headley | 110/346 |
| 4,230,451 | 10/1980 | Chambe | 110/255 X |
| 4,306,506 | 12/1981 | Rotter | 110/229 |

*Primary Examiner*—Edward G. Favors
*Attorney, Agent, or Firm*—Browdy and Neimark

[57] ABSTRACT

In a procedure and an installation for the incinerating of sludge, predried sludge is dried to residual moisture by the addition of heat in a first processing step and then pyrolized by the continued addition of heat and the exclusion of air in a second processing step, with the pyrolysis gas obtained being used at least partially to generate the hot fumes required for heat input. To incinerate sludge in a way which is compatible with the environment, saves energy and is inexpensive, the predried sludge is carried co-current with the hot fumes in the first processing step and the so-dried sludge is then, in the second step, carried in countercurrent flow to those same fumes. An evaporation worm-gear machine (1) with a worm shaft (9) capable of being driven by rotation, with at least one spiral coil (14), which is placed in a housing (3) serves to carry out the first processing step, while a pyrolysis rotation cylindrical reactor (2) with an opposite direction of movement of the material which is in the hollow-built worm shaft (9) serves to effect the second processing step.

15 Claims, 2 Drawing Figures

PROCEDURE AND INSTALLATION FOR THE INCINERATING OF SLUDGE

FIELD OF INVENTION

The invention is concerned with incinerating sludge.

BACKGROUND OF INVENTION

The process of burning sludge is known. In that process, toxic heavy metals are converted from sludge into the gas phase at high temperatures of combustion from 700° to 900° C. (973 K to 1173 K) and are discharged to the atmosphere in an extremely poisonous form as heavy-metal oxides. Furthermore, a great deal of additional energy is required for a thermal afterburning of the fumes. When sludge is burned in fluid-bed furnaces with afterburning chambers, the waste heat of the fumes cannot be used without encountering problems because the fumes are heavily laden with flue dust. Water-injection coolers which are used absorb a considerable portion of the available energy. Purifying large amounts of such fumes, which contain from 20 to 40% of water vapor, is extraordinarily expensive.

First air-drying sludge and then heating it to at least 900° to 1,200° C. (1173 to 1473 K) in an externally heated retort furnace is known from Swiss Pat. No. 478 216. In that process, a considerable portion of the sludge is vaporized. The hot, purified gas is cooled in a heat exchanger to extract steam, and the cooled gas is then available as heating gas.

A procedure and an installation for producing flammable gases from lumpy domestic and industrial refuse are known from U.S. Pat. No. 4,142,867. In that process, the lumpy wastes are first carbonized in rotating drums by indirect heating in the absence of air at temperatures between 300° and 600° C. (573 and 873 K). Next, the carbonization gases are decomposed into combustible gases, at temperatures between 1,000° and 1,200° (1273 and 1473 K), while supplying air which has been preheated by the hot combustible gases that have been generated and low-temperature coke obtained in the first step. The recovery of valuable materials from the lumpy wastes in the second step of the procedure is important in this process. This procedure, which requires rotating drums in the first step, is not suitable for incinerating pure sludge without domestic refuse.

The decomposing of high-polymer, solid waste materials such as polyethylene, polypropylene, etc., into gaseous and liquid fuels with heat and later cooling the so-generated gases is known from U.S. Pat. No. 3,947,256. In that process, the waste materials are melted by heating and compressing in an initial area in a heated extruder, heated to a higher temperature and partially broken up in a second area and vaporized by overheating with simultaneous low pressure in a third area. This procedure is not suitable for incinerating sludge.

Drying sludge in a rotary drier and then using it as fertilizer is known from VDI-Nachrichten No. 43 of Oct. 26, 1979. This procedure consumes a lot of energy.

SUMMARY OF INVENTION

It is a basic object of the invention to provide a procedure of an appropriate type which makes possible incineration which is compatible with the environment, saves energy and is inexpensive; and to provide an installation for carrying out the procedure.

Such object is accomplished by the invention by means of the procedural steps of the invention wherein the sludge is acted upon with fumes at a particularly high temperature—i.e. with heat having a high temperature difference—at the beginning of the process of evaporation, by heating the sludge co-currently initially to effect drying, and then counter-currently to effect pyrolization. As a result, the sludge is heated up to the volatilization temperature of the moisture contained in it—i.e. particularly of the water contained in it—very quickly. Then the evaporation—i.e. the drying—of the sludge to a residual moisture of less than 20% by weight in relation to the total weight takes place. By this management of the temperature during the first step of the processing, the possibility that a pyrolysis of the sludge might take place right then is excluded with certainty. Because of the high temperature difference at the beginning of the first step of the processing, a rapid evaporation takes place when a large amount of moisture is present, while the residual moisture is expelled more slowly toward the end of the first step, i.e. when the difference in temperature between the sludge and the fumes has become smaller. Because the sludge, which has already been dried to a residual moisture of less than 20% by weight in relation to the total weight is conducted in countercurrentflow to the same fumes in the second stage, it is heated continuously and pyrolyzed because of the simultaneous exclusion of air. This increasing difference in temperature between fumes and sludge during the pyrolysis process is optimal as far as procedural technique is concerned.

Optimal heat transfer conditions are achieved, in the first place, with respect to the first processing step and, in the second place, with respect to the second processing step, while the heat losses of the fumes are being kept to a minimum at the same time, by effecting the first step in an annular chamber surrounding the fumes which serve as heating means, with the several steps being effected in a chamber lying inside the annular passageway in which the hot fumes are passed. Particularly good heat transfer conditions on the sludge which is to be dried and on the sludge which is to be pyrolized are obtained by feeding the hot fumes at a high speed, optimally 20–50 m/sec.

An especially simple, and consequently inexpensive, installation for carrying out the procedure includes an external worm shaft working in an outer annular chamber, an inner annular chamber for the hot fumes, and central chamber for the sludge being pyrolized. By conducting the fumes through the inner annular heating duct between the worm shaft and the pyrolysis rotating inner cylindrical reactor, one makes sure that the heat is conveyed to the sludge which is to be dried from inside and is only conveyed to the outer housing of the worm gear machine from the sludge. By this means, it is assured that the temperature at the worm shaft is higher than that of the wall of the outer housing. This, in turn, results in the achievement of a reliable treatment and economical transferring of the sludge in the first processing step.

By means of a curved transfer conduit between the worm shaft annular chamber and the central reactor, it is ensured that there is always powdery sludge in such conduit, so that a sufficient, gastight separation is provided between the evaporation area, on the one hand, and the pyrolysis area, on the other. The lengths of time the sludge is in the evaporation area, on the one hand, and in the pyrolysis area, on the other, can be suitably controlled by means to adjust the inclination of the machine, so that such lengths of time are of extremely different duration, and consequently each such time can be rendered optimal. For example, the time of evaporation is suitably about 10 to 20 minutes, while the length of time for the sludge to stay in the rotating cylindrical reactor can be between 0.5 and 6 hours.

BRIEF DESCRIPTION OF DRAWING

Additional advantages and features of the invention will be more apparent from the following description of an embodiment of it, with the help of drawings. In the drawings.

DETAILED DESCRIPTION OF EMBODIMENT

Figure 1:
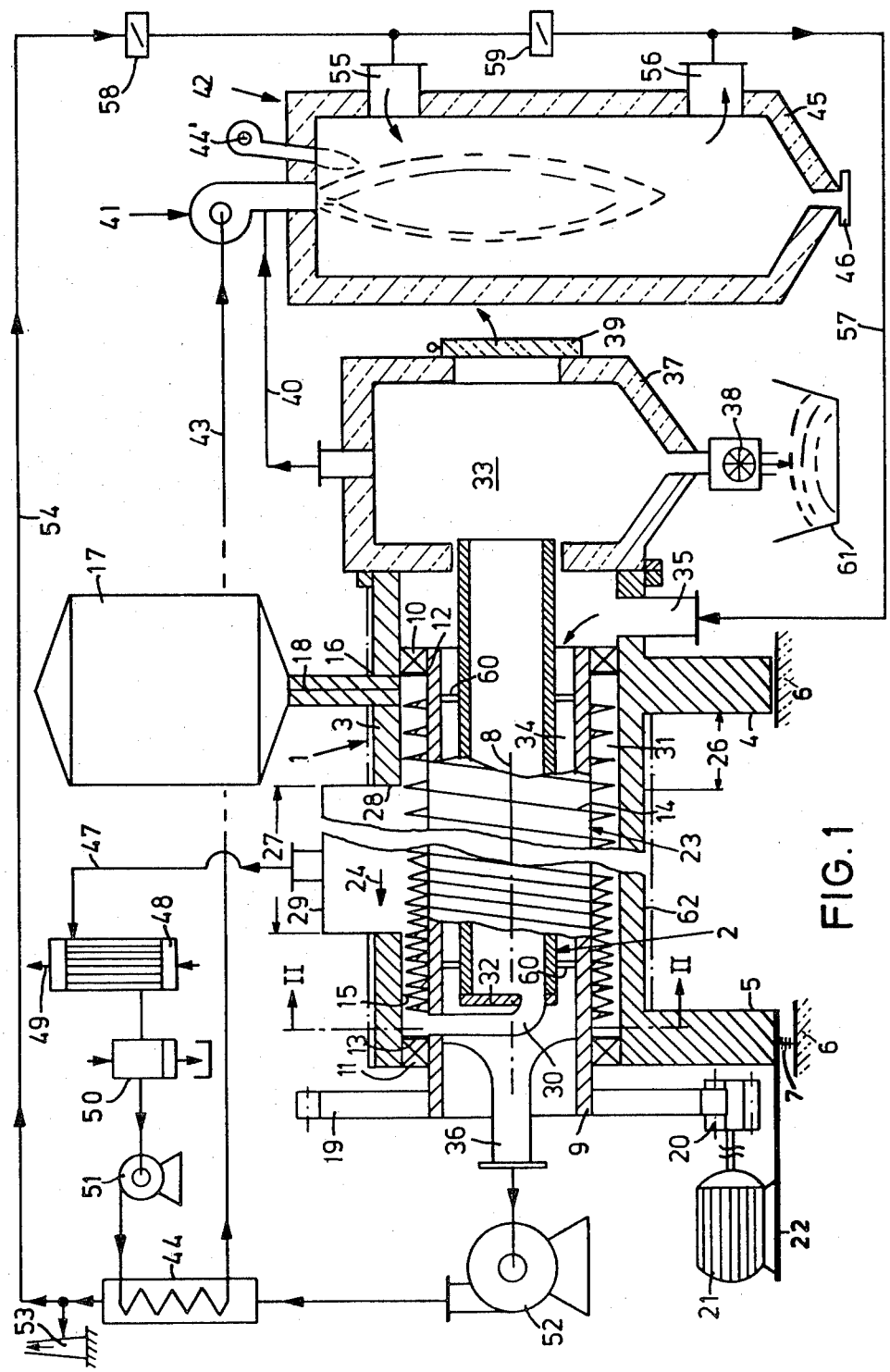
FIG. 1 is a front-elevation drawing of an installation constructed in conformity with the invention.

The major part of the sludge-incineration installation shown in the drawings is a single-phase evaporation worm-gear machine 1 with an integrated pyrolysis rotating cylindrical reactor 2. The evaporation worm-gear machine 1 has a housing 3 which is divided horizontally in the usual way and which is supported by legs 4, 5 resting on the floor or a base that is attached to it in the area of its two ends. One leg 5, resting on a base 6, has a height-adjusting device 7 connected with it so that the inclination of the entire worm-gear machine 1 with respect to the horizontal can be changed.

Inside the housing 3, which is a hollow cylinder, and coaxially with its central axis 8, is provided a worm shaft 9 which also is built as a hollow cylinder. The hollow worm shaft 9 is supported, in the area of the two ends of the housing 3, by roller bearings 10, 11 which are resistant to high temperatures, and which themselves are supported by the housing 3. These roller bearings 10, 11 have gaskets 12, 13 which also are resistant to high temperatures and which can be the generally-familiar non-contact laminated gaskets, for example.

In the illustrated housing 3, the worm shaft 9 has several spiral coils 14 whose outer circumference—leaving a small amount of running clearance free—extends to the inner wall 15 of the housing 3 within an annular space 31. The worm shaft 9 together with the screws 14 define a worm gear 23. The entrance side 16 of the worm-gear machine 1 is at one end of the housing 3. A storage container 17 which serves the purpose of intermediate storage is provided there, and a discharge conveying means, e.g. a single-shaft discharge worm gear 18, leads into the worm-gear machine 1 from the storage container 17.

The worm shaft 9 projects out of the exit side of the housing 3 opposite the entrance or feeding side 16 of the housing 3. Such shaft 9 is provided with a spur gear 19 there so that it cannot freely rotate; and such spur gear 19, in turn, engages a driving pinion 20 of an electric driving motor 21. The driving motor itself is fastened to the housing 3 with a bearing block 22, so that the position of the driving motor 21 with respect to the worm gear 9, and consequently the meshing between the driving pinion 20 and the spur gear 19, does not change when the inclination of the housing 3 is changed by means of the height-adjustment device 7.

Figure 2:
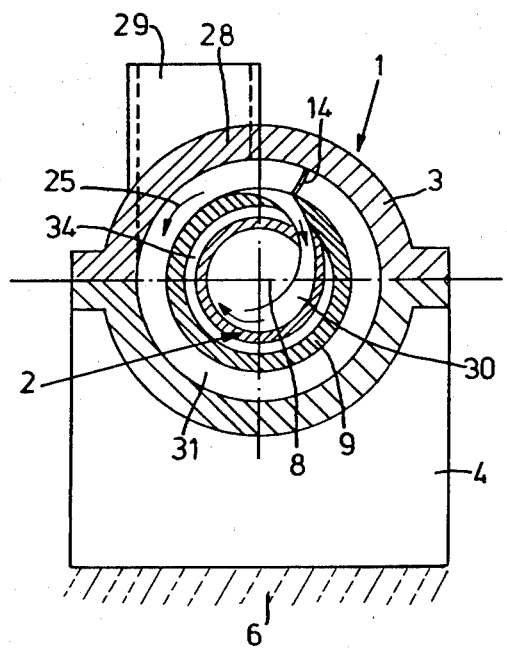
FIG. 2 is a cross section along the line II—II in FIG. 1.

Driving the worm gear 23 is accomplished by having the mechanically-predried sludge, which is fed to the annular space 31 from the storage container 17 by means of the discharge conveyor 18, moved from the feeding side 16 to the exit side of the evaporation worm-gear machine 1 in accordance with the arrow 24 indicating direction of movement in the annular space 31. In FIG. 2, the corresponding direction of rotation is indicated by a corresponding arrow 25.

Downstream from the feeding side 16 there is a relatively short charging area 26 of the annular space 31 with an evaporation area 27 next to the charging area 26. In such evaporation area 27, the housing 3 has an opening 28 which extends over the length of the evaporation area 27, and a dome-shaped hood 29 for vapors is located above such opening. The opening 28 is placed eccentrically in the half of the top of the housing 3 in which the spiral coils 14 move downward again, as can be seen in FIG. 2. The material in this area is taken in by the coils 14 repeatedly. Because of such placement of the opening 28 adjacent the downwardly moving screws 14 the sludge being processed will not be squeezed out into the hood 29 through the opening 28.

At the exit side of the evaporation worm-gear machine 1 opposite the feeding side 16, looking in the direction of the arrow 24—i.e. downstream of the evaporation area 27—a conduit 30 leads from the annular space 31 in the worm-gear machine 1 through which the material is conveyed, into the rotating cylindical reactor 2. As can be seen from FIG. 1 in combination with FIG. 2, the conduit 30 is constructed approximately in the shape of a spiral and runs from the annular space 31 in the direction opposite to the direction of rotation 25, to the front side 32 of the rotating cylindrical reactor 2, which is otherwise closed. By having the conduit 30 spiral or helical in shape and extending across the entire width, it is assured that the conduit is always partially filled with powdery sludge, so that an adequate seal is guaranteed between the evaporation area 27, on the one hand, and the rotating cylindrical reactor 2, on the other.

At its other end, which adjoins the feeding side 16 of the worm-gear machine 1, the rotating cylindrical reactor 2 ends in a cyclone type separator 33. An annular heat duct 34, which extends over the full length of the annular space 31 through which the material is conveyed, is located between the rotating cylindrical reactor 2 and the worm shaft 9. Hot fumes are conducted to this heat duct through a fume conducting inlet 35 which extends, in the housing 3, between the cyclone 33 and the roller bearings 10, and which is therefore only crossed by the downstream end of the rotating cylindrical reactor 2. At the opposite end of the annular heat duct 34, adjacent the spiral conduit 30, is a collective post for collecting fumes, the front end of the worm shaft 9 otherwise being closed off by the spur gear 19.

The dust collector constructed as a cyclone 33 in the usual manner is flanged to the housing 3. A bucket-wheel discharge device 38 or the like is provided at the funnel-shaped bottom 37 of the cyclone 33. A door 39 is provided the side wall of the cyclone 33 for providing access for cleaning and also serves as a blow-off post for protection against explosions. A conduit 40 for pyrolysis gas leads from the top of the cyclone 33 to a pyrolysis gas burner 41 in a combustion chamber 42. Heated air for combustion is conducted to that burner 41 from an air preheater 44 through a hot-air conduit 43. An auxiliary burner 44' adjoins the pyrolysis gas burner 41. An opening 46 for drawing off ash is provided in the bottom 45 of the combustion chamber 42.

A vapor conduit 47 leads from the hood 29 of the evaporation area 27 to a condenser 48 which is acted upon by a heat carrier, i.e. a coolant, belonging to another heat circuit 49 which is only designated by arrows showing the direction of flow. The condensate consisting of water and very volatile components is drawn off from the cooled-off vapors in a siphon 50. The non-condensed gases which remain are pumped through an air preheater 44, together with fresh air, by means of a blower 51, and from there they are conveyed to the burner 41 through the conduit 43 as hot air.

The preheating of the air in the air preheater 44 is accomplished by means of the fumes drawn out of the post 36 by a fume blower 52, and the fumes are taken through the air preheater 44 in a cross-counterflow manner as shown whereby a part of the heat of the fumes is transferred to the air in the preheater 44. A part of the fumes is transferred to the atmosphere downstream of the air preheater through a chimney 53, while another part is fed through a fume-return conduit 54 either into the combustion chamber 42 through an intake opening 55 or directly into the fume conduit 57 leading to the inlet 35 downstream from a fume-discharge outlet 56 of the combustion chamber 42. A valve 58 is located in the fume-return conduit 54 upstream of the intake opening 55 by which the total amount of the fumes which are to be conveyed directly to the combustion chamber and the fumes escaping from it is controlled. Dividing that amount of fumes is accomplished by a valve 59 which is provided in the fume-return conduit 54 between the intake opening 55 and the fume-discharge outlet 56 of the combustion chamber 42. It is advantageous for both valves 58, 59 to be solenoid valves, whose energizing is dependent upon the temperature in the combustion chamber 42 and in the fume-discharge exit 56.

The sludge-incineration installation described above works as follows: In a mechanical drainage appliance—e.g. a filter press or a machine-wire press—predried sludge in the form of filter cakes with a solids content of 35% to 45% by weight in relation to total weight, with the remainder consisting essentially of water, is stored in the storage container 17 temporarily and conveyed from it to the evaporation worm-gear machine 1 by means of the discharge worm gear 18. The sludge is then conveyed through the annular chamber 31 of the worm-gear machine 1 in the direction 24, during which the sludge is heated from the annular heat duct 34, through which fumes which have an initial temperature of 700° C. (973 K) are conveyed at high speed from the fume inlet 35. As a result of the fact that the sludge is only heated from the worm shaft 9 with a surface temperature of the worm shaft of over 180° C. (453 K), while the housing 3 is unheated, an orderly conveying of the sludge is ensured.

As a result of the fact that the sludge is carried by the worm gear 23 in the same direction as the fumes in the heat duct 34, the heating of the sludge to the desired volatilization temperature takes place very quickly over a relatively short section of the worm gear 23. The difference in temperature between the fumes and the sludge is actually the greatest in the region of the charging area. Because of the volatilization heat required in the evaporation area 27, the temperature of the sludge increases only a little bit over that entire area of the length of the worm-gear machine 1. On the other hand, the temperature of the fumes decreases.

At the end of the annular chamber 31 through which the material is conveyed—i.e. before the sludge goes over into the conduit 30—the temperature of the sludge is between 180° and 240° C. (453 K to 513 K). By means of this temperature regime in the evaporation area 27, it is assured that a pyrolysis—i.e. a carbonization of the sludge in the evaporation worm-gear machine—does not take place right then. Before the sludge goes over into the conduit 30, it has a lumpy to powdery consistency and has a residual water content of less than 20%.

The sludge, which has been evaporated to a solids proportion of more than 80%, and which has become divided into powder to a great extent, falls into the conduit 30 at the end of the chamber 31 through which it has been conveyed and flows through that conduit into the pyrolysis rotating cylindrical reactor, which is sealed off from the evaporation area 27 sufficiently tightly by the powdery sludge itself. As a result of the rotation of the rotating cylindrical reactor 2, maintained coaxially in the worm shaft 9 by spacers, and because of the adjustable inclination of the longitudinal axis 8 with respect to the horizontal, the sludge powder moves through the rotating cylindrical reactor 2, remaining in it for from 0.5 to 6 hours. Because the sludge is moved in the rotating cylindrical reactor 2 in countercurrent flow with respect to the fumes flowing through the heat duct 34, the sludge is heated from the inlet temperature of 180° to 240° C. to 400° to 600° C. (673 K to 873 K), with exclusion of air, and in the process it is completely pyrolized (carbonized).

The pyrolysis gases which are released are separated from powdered components in the cyclone 33 to a great extent. Those components and the pyrolysis coke emerging from the rotating cylindrical reactor 2 after the pyrolysis are discharged from the cyclone 33 through the bucket-wheel discharging device 38 and conveyed to a slag heap by means of a suitable ash carrier 61, or in case of their special characteristics as hydraulic bonders then components may be used for mud conditioning or the purification of waste water.

The pyrolysis gases having a temperature of 400° to 500° C. (673 to 773 K) are conveyed to the pyrolysis burner 42 and burned there along with air at approximately 200° C. (473 K) which has been conveyed there through the hot-air conduit 43. The pyrolysis gas is completely burned in the burner 42 to $CO_2$ and $H_2O$. To make sure of obtaining optimal burning in the combustion chamber 42, the volume for the combustion chamber is pre-selected large enough so that the gases have a residence period of a few seconds in the combustion chamber 42. Furthermore, the burning temperature is adjusted to from 800° to 900° C. (1073 to 1173 K) by mixing in relatively cool fumes from the fume return conduit 54 and through the intake opening 55 in order to prevent the formation of harmful materials.

The fumes emerging from the combustion chamber 42 with a temperature of from 800° to 900° C. through the exit 56 and into the conduit 57 are adjusted to a temperature of approximately 700° C. (973 K) by adding cool fumes from the line 54 through the valve 59. The fumes at about 700° C. are conveyed to the inlet 35 of the annular heat duct 34.

The heat obtained in the condenser 48 by cooling the vapor is used in the heat circuit 49, for example, to produce heating water, to heat work spaces in winter, to heat a sludge-digestion tower or to heat freon vapor for a work process or to evaporate separator slime under a vacuum of approximately 25% to 40% solids, which then can be conveyed directly to the evaporation worm-gear machine 1.

It is advantageous to provide the housing 3 of the evaporation worm-gear machine 1 with insulation 62, which is only indicated with broken lines in FIG. 1, in order to minimize losses of heat.

Furthermore, as is indicated in FIG. 1, the worm-gear 23 can be constructed in such a way that it has a single-thread profile in its end area, while the rest of it, from the charging area 26 on, shifts from a triple-thread to a double-thread profile. In other words, from three spiral coils 14 in the charging area 26, a switch to only one spiral coil 14 in the end area suitable takes place, as is also shown in FIG. 2. Alternatively, the worm gear 23 can also be constructed single-threadedly throughout its length; but then it has a constantly decreasing thread pitch in the direction in which the material is conveyed. In both cases, a filling volume remaining approximately the same over the length of the worm gear, such as is known for extruders used in plastics technology, is obtained by this means.

It will be obvious to those skilled in the art that various changes may be made without departing from the scope of the invention and the invention is not to be considered limited to what is shown in the drawings and described in the specification.

What is claimed is:

1. Method for the incinerating of sludge in which predried sludge is dried to residual moisture by the addition of heat in a first processing step and then is pyrolyzed, with the continued addition of heat and the exclusion of air, in a second processing step, and in which the pyrolysis gas obtained is used at least partially to generate the hot fumes required for heat input, characterized in that the predried sludge is carried co-currently with the hot fumes in the first processing step and that said sludge dried to residual moisture in the first step is then carried in the second processing step in countercurrent flow to said same fumes.

2. Method as claimed in claim 1, wherein the sludge is carried so as to surround the fumes in the first processing step, and in the second processing step the sludge is surrounded by said fumes.

3. Method as claimed in claim 1 or 2, wherein the fumes are carried at a speed of from 20 to 50 meters per second.

4. Method according to claim 1, wherein the first step is carried out for about 10–20 minutes and the second step for about 30 minutes to 6 hours.

5. Installation for the incineration of sludge, comprising means to dry sludge including an evaporation worm-gear machine (1) with a worm shaft (9) capable of being driven by rotation, with at least one spiral screw (14) for movement in an outer annular chamber (31) said worm-gear shaft being located in a housing (3); means to pyrolyse the dried sludge including a pyrolysis rotating cylindrical reactor (2) within the worm shaft (9), means to ensure movement of sludge in said reactor in a direction opposite to the direction of movement (24) of the worm-gear machine (1); the outer annular chamber (31) of the worm-gear machine (1) through which the material is conveyed being connected with the rotating cylindrical reactor (2) by a conduit (30); and a heat duct (34) for hot fumes located between the worm shaft (9) and the rotating cylindrical reactor (2).

6. Installation as claimed in claim 5, wherein the conduit (30) is spiral or helical in shape.

7. Installation as claimed in claim 5 or 6, comprising means to adjust the inclination of the rotating cylindrical reactor (2) with respect to the horizontal.

8. Installation as claimed in claim 5 or 6, wherein the rotating cylindrical reactor (2) is mounted concentrically in the worm shaft (9) and connected with it in such a way that said reactor cannot rotate relative to said worm shaft.

9. Installation as claimed in claim 8, further comprising means to adjust the inclination of the worm-gear machine (1).

10. Installation as claimed in claim 5, further comprising an evaporation area (27) in the worm-gear machine (1), an outlet conduit (27) from said evaporation area, and a condenser (48) along said outlet conduits.

11. Installation as claimed in claim 5, further comprising a cyclone (33) located directly downstream from said rotating cylindrical reactor (2).

12. Installation as claimed in claim 11, wherein said cyclone (33) is connected with a pyrolysis gas burner (41) of a combustion chamber (42) through a pyrolysis gas conduit (40), said combustion chamber having a fume-discharge exit (56) connected with an inlet (35) for conducting fumes to said heat duct (34) in the housing (3) of the worm-gear machine (1).

13. Installation as claimed in claim 12, further comprising a collection post (36) for collecting fumes provided at the downstream end of the heat duct (34) and an air preheater (44) downstream of said collective post (36) for preheating the air for combustion for the pyrolysis gas burner (41).

14. Installation as claimed in claim 13, further comprising a fume-return conduit (54) leading to the combustion chamber (42) from the air preheater (44).

15. Installation as claimed in claim 14, wherein said fume-return conduit (54) is connected through a fume conduit (57) to said inlet (35) downstream from said fume-discharge exit (56) of the combustion chamber (42).

* * * * *